US012254823B2

United States Patent
(12) United States Patent
Suzuki

(10) Patent No.: US 12,254,823 B2
(45) Date of Patent: Mar. 18, 2025

(54) DISPLAY DEVICE AND METHOD FOR CONTROLLING DISPLAY DEVICE

(71) Applicant: SHARP KABUSHIKI KAISHA, Sakai (JP)

(72) Inventor: Hiroto Suzuki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/527,728

(22) Filed: Dec. 4, 2023

(65) Prior Publication Data

US 2024/0194130 A1 Jun. 13, 2024

(30) Foreign Application Priority Data

Dec. 8, 2022 (JP) ................................ 2022-196002
Sep. 26, 2023 (JP) ................................ 2023-161793

(51) Int. Cl.
*G09G 3/32* (2016.01)
*G09G 3/04* (2006.01)

(52) U.S. Cl.
CPC ............... *G09G 3/32* (2013.01); *G09G 3/045* (2013.01); *G09G 2320/066* (2013.01); *G09G 2360/16* (2013.01)

(58) Field of Classification Search
CPC ........ G09G 3/045; G09G 3/3426; G09G 3/32; G09G 2320/066; G09G 2360/16
See application file for complete search history.

(56) References Cited

U.S. PATENT DOCUMENTS

| | | | | |
|---|---|---|---|---|
| 7,486,304 B2 * | 2/2009 | Bergquist | G09G 3/3413 | 345/88 |
| 7,535,482 B2 * | 5/2009 | Lee | G09G 5/10 | 345/204 |
| 9,865,191 B2 * | 1/2018 | Yata | G09G 3/2003 | |
| 10,163,402 B2 * | 12/2018 | Kamio | G09G 3/3406 | |
| 10,217,197 B2 * | 2/2019 | Mantiuk | H04N 9/68 | |
| 10,269,311 B2 * | 4/2019 | de Greef | G09G 5/399 | |
| 10,276,108 B2 * | 4/2019 | Chu | G06T 5/94 | |
| 10,354,616 B2 * | 7/2019 | Lee | G02B 27/01 | |
| 10,459,318 B2 * | 10/2019 | Iwata | G03B 17/18 | |
| 10,497,319 B2 * | 12/2019 | Nakanishi | G09G 3/34 | |
| 10,573,249 B2 * | 2/2020 | Chesnokov | G09G 3/3611 | |
| 10,591,769 B2 * | 3/2020 | Harada | G09G 3/3406 | |
| 10,803,829 B2 * | 10/2020 | Harada | G09G 3/3413 | |

(Continued)

FOREIGN PATENT DOCUMENTS

JP 2019-090997 A 6/2019

*Primary Examiner* — Vinh T Lam
(74) *Attorney, Agent, or Firm* — ScienBiziP, P.C.

(57) ABSTRACT

A display device includes: a display that displays an image based on image data; a backlight device that irradiates the display with light; an image determiner that determines, based on the image data, whether the image includes a target image having a contrast higher than a reference contrast; and a luminance value setter that sets each luminance value of the image based on the image data, wherein when the image determiner determines that the image includes the target image, the luminance value setter changes the luminance value set for at least one of two or more areas in the target image to reduce a difference between the luminance values of the two or more areas in the target image set based on the image data.

11 Claims, 10 Drawing Sheets

(56) References Cited

U.S. PATENT DOCUMENTS

| | | | | |
|---|---|---|---|---|
| 10,859,823 | B1 * | 12/2020 | Choi | G02B 27/0101 |
| 10,872,557 | B2 * | 12/2020 | Urabe | G06F 9/3004 |
| 10,891,917 | B2 * | 1/2021 | Kuo | G09G 5/38 |
| 10,971,050 | B2 * | 4/2021 | Lin | G09G 3/3225 |
| 11,004,904 | B2 * | 5/2021 | Lee | H10K 59/35 |
| 11,056,079 | B2 * | 7/2021 | Sakai | G09G 5/10 |
| 11,222,410 | B2 * | 1/2022 | Park | G09G 5/02 |
| 11,244,640 | B2 * | 2/2022 | Yin | G09G 3/36 |
| 11,276,369 | B2 * | 3/2022 | Jung | G09G 5/10 |
| 11,315,525 | B1 * | 4/2022 | Hong | G09G 5/10 |
| 11,341,932 | B2 * | 5/2022 | Choi | G09G 3/2007 |
| 11,468,833 | B2 * | 10/2022 | Lee | G09G 5/003 |
| 11,488,519 | B2 * | 11/2022 | Hyeon | G09G 3/32 |
| 11,551,624 | B2 * | 1/2023 | Ishii | G09G 3/3648 |
| 11,594,177 | B2 * | 2/2023 | Lee | G09G 5/10 |
| 11,676,549 | B2 * | 6/2023 | Wang | G09G 3/006<br>345/102 |
| 11,756,505 | B2 * | 9/2023 | Xu | G09G 5/10<br>345/204 |
| 11,776,495 | B2 * | 10/2023 | Ooga | G09G 3/3426<br>345/694 |
| 11,830,394 | B2 * | 11/2023 | Wooster | G09G 3/3426 |
| 11,869,418 | B1 * | 1/2024 | Yang | G09G 3/32 |
| 11,881,144 | B2 * | 1/2024 | Park | G09G 3/2007 |
| 11,935,492 | B2 * | 3/2024 | Pytlarz | G09G 3/3406 |
| 11,961,212 | B2 * | 4/2024 | Kim | G06T 5/94 |
| 11,984,087 | B2 * | 5/2024 | Nam | G09G 3/342 |
| 12,020,666 | B2 * | 6/2024 | Aogaki | G09G 5/10 |
| 12,073,801 | B2 * | 8/2024 | Ooga | G09G 3/36 |
| 12,100,126 | B2 * | 9/2024 | Mantiuk | A61B 3/024 |
| 12,148,397 | B2 * | 11/2024 | Jang | G09G 3/2003 |
| 2011/0148906 | A1 * | 6/2011 | Jeong | G09G 3/2007<br>345/589 |
| 2021/0225324 | A1 * | 7/2021 | Furihata | G09G 3/3233 |
| 2022/0130346 | A1 * | 4/2022 | Hong | G09G 5/10 |
| 2022/0148528 | A1 * | 5/2022 | Ooga | G09G 3/3426 |
| 2022/0398997 | A1 * | 12/2022 | Huang | G09G 5/10 |
| 2023/0102440 | A1 * | 3/2023 | Aogaki | G09G 5/10<br>345/690 |
| 2024/0005882 | A1 * | 1/2024 | Maruhashi | G09G 3/3426 |
| 2024/0029616 | A1 * | 1/2024 | Nakamura | G09G 5/10 |
| 2024/0096260 | A1 * | 3/2024 | Baek | G09G 3/3291 |

* cited by examiner

| | 黒 | レ | ベ | ル |
|---|---|---|---|---|
| AVERAGE GRADATION | 255 | 117 | 133 | 125 |
| MAXIMUM GRADATION | 255 | 255 | 255 | 255 |

| | 黒 | レ | ベ | ル |
|---|---|---|---|---|
| REPRESENTATIVE GRADATION | 255 | 117 | 133 | 125 |
| OUTPUT GRADATION | 255 | 225 | 255 | 240 |

DISPLAY DEVICE AND METHOD FOR CONTROLLING DISPLAY DEVICE

BACKGROUND OF THE INVENTION

Field of the Invention

The present disclosure relates to a display device and a method for controlling the display device.

Description of the Background Art

There is a known image display device (display device) that divides an image to be displayed into a plurality of regions and sets the luminance of a light source in accordance with a feature value of an image in each of the divided regions.

In the known display device, the lower limit value of the luminance control of the light source is adjusted for each region so that it is possible to suppress luminance unevenness of the entire image.

The known display device uses a backlight having a light emitting diode (LED) mounted thereon as a light source. The use of a backlight having a light emitting element, such as a mini LED, smaller than a conventional LED mounted thereon as a light source may cause luminance unevenness in a target image having a contrast higher than a reference contrast. For example, luminance unevenness may occur in a character string image such as a caption image including a plurality of character images or an image having a mixture of a high-contrast image area and a smooth image area having a predetermined luminance.

An object of the present disclosure is to provide a display device and a method for controlling the display device capable of suppressing luminance unevenness in a target image having a contrast higher than a reference contrast.

SUMMARY OF THE INVENTION

A display device according to an aspect of the present disclosure includes a display that displays an image based on image data, a backlight device that irradiates the display with light, an image determiner that determines, based on the image data, whether the image includes a target image having a contrast higher than a reference contrast, and a luminance value setter that sets each luminance value of the image based on the image data, wherein when the image determiner determines that the image includes the target image, the luminance value setter changes the luminance value set for at least one of two or more areas in the target image to reduce a difference between the luminance values of the two or more areas in the target image set based on the image data.

A method for controlling a display device according to an aspect of the present disclosure includes determining, based on image data, whether an image to be displayed on a display includes a target image having a contrast higher than a reference contrast, and setting each luminance value of the image based on the image data, wherein when it is determined in the determining that the image includes the target image, the setting changes the luminance value set for at least one of two or more areas in the target image to reduce a difference between the luminance values of the two or more areas in the target image set based on the image data.

DESCRIPTION OF THE PREFERRED EMBODIMENTS

Figure 1:
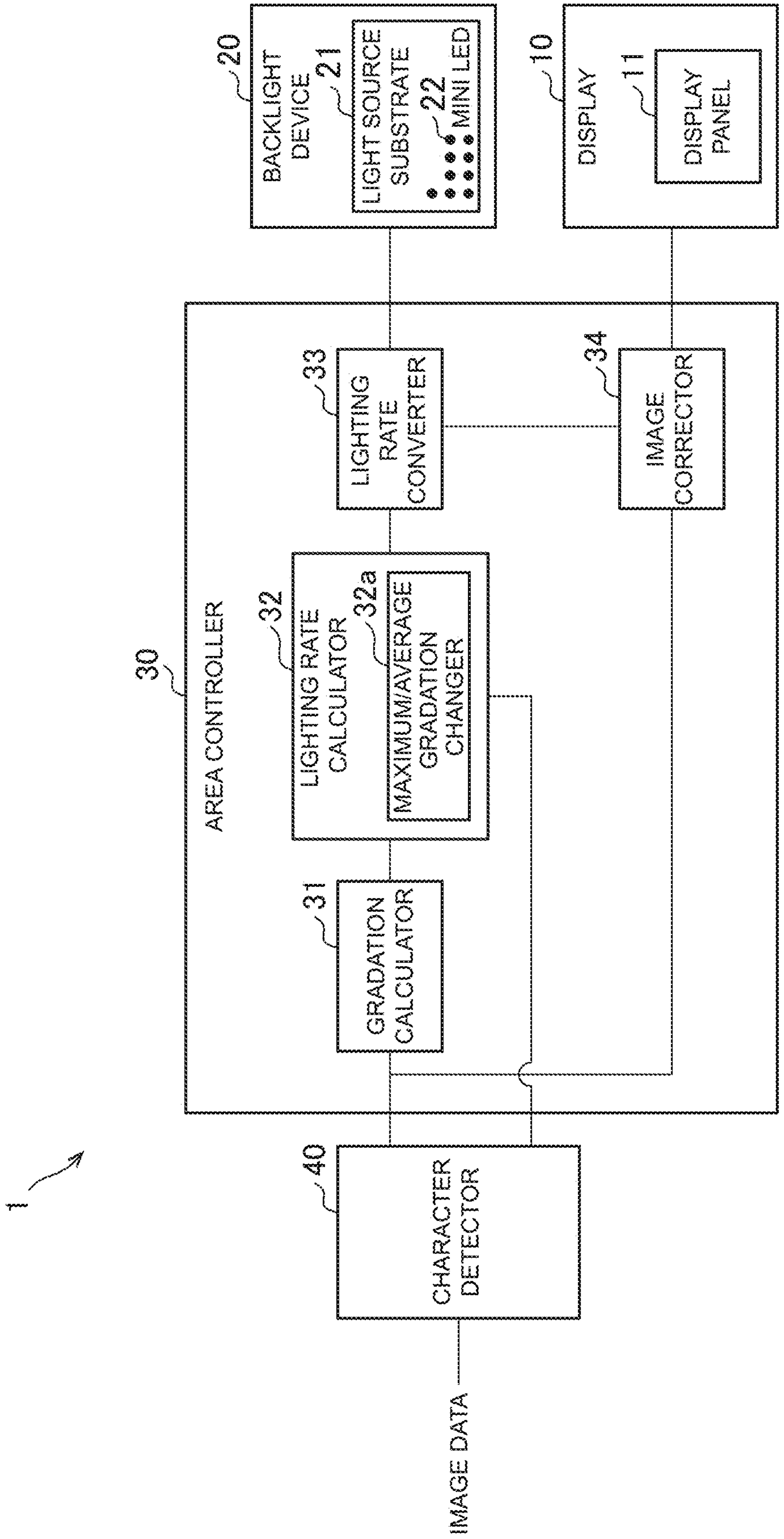
FIG. 1 is a block diagram illustrating an example of a configuration of a primary part of a display device according to a first embodiment of the present disclosure.

Embodiments and modifications of the present disclosure will be described with reference to the drawings. In the following description, the same or corresponding elements are denoted by the same reference numerals throughout the drawings, and their redundant descriptions thereof will be omitted. Further, the embodiments and modifications described below are merely examples of the present disclosure, and the present disclosure is not limited to the embodiments and modifications. Even in cases other than the embodiments and the modifications, various changes may be made in accordance with the design, or the like, without departing from the technical idea of the present disclosure.

First Embodiment

A configuration of a display device 1 according to a first embodiment of the present disclosure will be described with reference to FIG. 1. FIG. 1 is a block diagram illustrating an example of a configuration of a primary part of the display device 1 according to the first embodiment of the present disclosure.

The display device 1 is a display device that displays an image based on an image signal input from outside. For example, a thin liquid crystal television using a liquid crystal panel as a display panel 11 that displays an image may be exemplified as the display device 1.

Although the details will be described below, the display device 1 is configured to perform what is called local dimming to divide the entire display image (image) displayed on the display panel 11 into a plurality of regions and adjust the brightness of the light emitted from a backlight device 20 in accordance with the brightness of the image displayed in each region.

As illustrated in FIG. 1, the display device 1 includes a display 10 including the display panel 11, the backlight device 20 including a plurality of mini LEDs 22 (light source), an area controller 30, and a character detector 40 (an example of a character determiner, that is, an image determiner). The image data generated from the image signal input from outside is input to the area controller 30 via the character detector 40. Then, the area controller 30 generates the control information for controlling the backlight device 20 and corrects the image data to be displayed on the display 10.

The backlight device 20 controls the lighting of the mini LED 22 based on the control information input from the area controller 30. Further, the display 10 displays an image on the display panel 11 based on the image data corrected by the area controller 30. The mini LED 22 is an LED device smaller than typical LEDs, and the length of one side of a light emitter of the LED device (the length of the light emitter) is in the range of values more than approximately 30 μm and equal to or less than approximately 800 μm.

In the display device 1, the light emitted from the backlight device 20 is controlled in units of pixels in the display 10 so that an image may be displayed on the display panel 11.

The display panel 11 is typically a liquid crystal panel, in which liquid crystal shutters including color filters are arranged in a matrix. The luminance of each pixel is controlled by setting a voltage for each pixel arranged in a matrix and obtaining the amount of opening/closing of the liquid crystal shutter in accordance with the voltage. Each pixel includes R, G, and B sub-pixels.

The backlight device 20 irradiates the display panel 11 included in the display 10 with light to display a video. The backlight device 20 includes a light source substrate 21 having the plurality of mini LEDs 22 mounted thereon as light sources. The display device 1 according to the first embodiment of the present disclosure is configured to perform local dimming. Therefore, in the backlight device 20, the light source substrate 21 is divided into a plurality of light emitting regions, and the amount of emitted light is adjusted and controlled for each light emitting region. More specifically, the display image is divided into a plurality of areas 50, and in the backlight device 20, the amount of emitted light is adjusted for each of the light emitting regions that are divided corresponding to the areas 50.

The luminance of each pixel is controlled in accordance with the lighting rate of the mini LED 22. Specifically, the luminance of each area is controlled based on the lighting rate of the mini LED 22, and the luminance of each image is controlled based on the gradation (transmittance) of the liquid crystal. When the lighting rate of the mini LED 22 alone is 100% and, in the light source substrate of 1000 cd/$m^2$, the lighting rate of the mini LED 22 is 50% and the gradation (transmittance) of the liquid crystal is 50%, the luminance of the pixel of the display image is 25%, that is, 250 cd/$m^2$. In this way, the luminance value of each pixel of the display image may be defined by the lighting rate of the mini LED 22 and the transmittance of the liquid crystal.

Furthermore, in the case of the configuration in which the backlight device 20 includes the mini LEDs 22 as light sources, the size of each light emitting region may be reduced as compared with the configuration in which an LED is provided as a light source. Therefore, in the case of the configuration in which the backlight device 20 includes the mini LEDs 22 as light sources, the display image may be divided into approximately the 100 or more areas 50. On the other hand, when the LED is provided as a light source, the number of divisions of the areas 50 of the display image is less than approximately 100.

Here, it is assumed that the display image includes a character string image and the area 50, the luminance of which is controlled with the light emitted from each light emitting region, corresponds to the display region of the character image corresponding to one character. Furthermore, it is assumed that, in the configuration, the amount of light emitted from each light emitting region is adjusted such that the luminance value of each of the areas 50 becomes the average luminance value of a plurality of pixels included in each of the areas 50.

Figure 2:
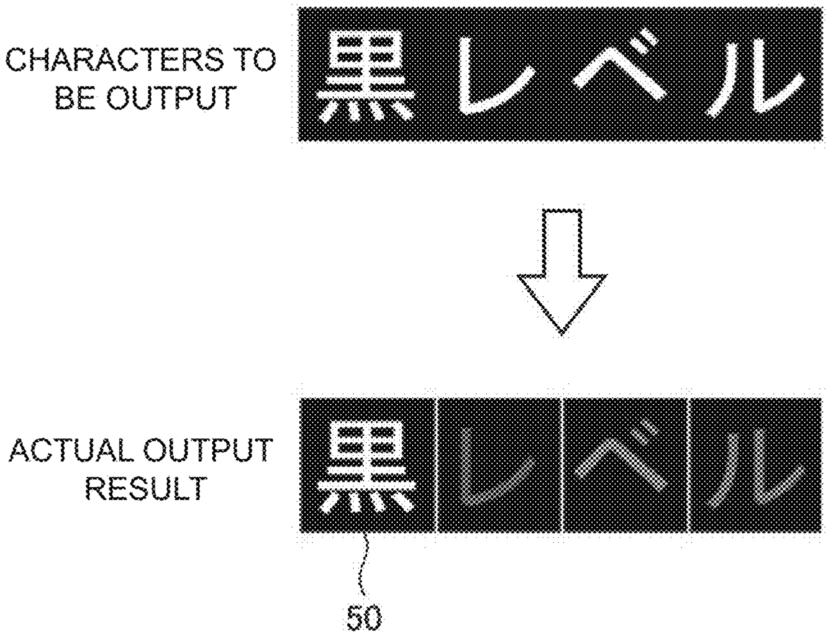
FIG. 2 is a diagram illustrating an example of the correspondence relationship between a character string image to be output in the display device according to the first embodiment of the present disclosure and a character string image illustrated as an actual output result.

In the case of this configuration, as illustrated in FIG. 2, when the density of the character (the number of pixels of the character portion) displayed in each of the areas 50 is different, there are a brightly displayed character and a darkly displayed character in accordance with the difference in the density between the characters, which causes luminance unevenness when viewed as the entire character string image. FIG. 2 is a diagram illustrating an example of the correspondence relationship between a character string image to be output in the display device 1 according to the first embodiment of the present disclosure and a character string image illustrated as an actual output result.

Specifically, in the example illustrated in FIG. 2, character string images of "黒", "レ", "ベ", and "ル" are displayed in white characters on the black background. In this case, as "黒" having a high density of one character in each of the areas 50 is displayed more brightly than the others, "レ", "ベ", and "ル" having a low density, luminance unevenness occurs in the entire character string image of "黒レベル"..

Such luminance unevenness in the character string image is particularly noticeable in the configuration where the mini LEDs 22 are provided as light sources and the luminance is adjustable with high definition.

Therefore, in the configuration of the display device 1 according to the first embodiment of the present disclosure, the character detector 40 determines whether the display image includes a plurality of character images (character string images), and when a plurality of character images is included, the area controller 30 controls the lighting rate of the mini LED 22 that emits light to each of the areas 50, in which each character image is displayed, to change the luminance value.

More specifically, the character detector 40 determines whether the display image displayed on the display 10 includes a character string image including a plurality of character images. When it is determined that the display image includes a character string image, the character detector 40 transmits the information about the character string image to the area controller 30. The information about the character string image includes the display region information on the character string image indicating which region of the display image displays the character string image. The detailed configuration of the character detector 40 will be described below.

The area controller 30 is a block that controls local dimming. The area controller 30 divides the display image displayed on the display 10 into the areas 50 corresponding to the respective light emitting regions of the light source substrate on which the plurality of mini LEDs 22 is mounted. Then, the control information including a backlight lighting rate signal corresponding to each of the divided areas 50 and the image data corrected in accordance with the control information are generated.

The image data generated by signal processing of an image signal by a signal processor (not illustrated) is transmitted to the area controller 30. As an example of the signal processing, the signal processor adjusts the gradation characteristics of an image by tone mapping, or the like, or removes noises by filter processing.

As illustrated in FIG. 1, the area controller 30 includes a gradation calculator 31, a lighting rate calculator 32 (luminance value setter), a lighting rate converter 33, and an image corrector 34.

The gradation calculator 31 calculates a gradation value from image data. In the example described below, the gradation value is represented by 8 bits, that is, the gradation value has a pixel value of 0 to 255. The gradation calculator 31 divides the display image for each of the areas 50 corresponding to each light emitting region and calculates the gradation value in each of the areas 50. The gradation calculator 31 transmits the calculated gradation value in each of the areas 50 to the lighting rate calculator 32.

The lighting rate calculator 32 determines a representative gradation value that is a representative based on the gradation values in the respective areas 50 received from the gradation calculator 31. Then, the lighting rate calculator 32 calculates the backlight lighting rate corresponding to the determined representative gradation value to set the luminance value of each of the areas 50. The representative gradation values 0 to 255 are set to correspond to the backlight lighting rates 0% to 100%.

Furthermore, the lighting rate calculator (luminance value setter) 32 includes a maximum/average gradation changer **32*a*. When the information about the character string image is received from the character detector 40, the maximum/average gradation changer 32*a* sets the representative gradation value in each of the areas 50 corresponding to each of the plurality of character images as the maximum gradation value (an example of a predetermined luminance value) in each of the areas 50. Further, the lighting rate calculator (luminance value setter) 32 may set the representative gradation value in each of the areas 50 corresponding to each of the plurality of character images to a predetermined gradation value (an example of the predetermined luminance value) smaller than the maximum gradation value, such as a gradation value of 80% of the maximum gradation value of the plurality of pixels constituting each of the plurality of character images. The lighting rate calculator (luminance value setter) 32 may set the representative gradation value in each of the areas 50 corresponding to each of the plurality of character images to the average value (an example of the predetermined luminance value) of the gradation values (luminance values) corresponding to the plurality of character images. That is, the above-described predetermined gradation value (predetermined luminance value) may be any value as long as it is determined based on a plurality of gradation values (luminance values) of a plurality of pixels corresponding to each of a plurality of character images. Conversely, the maximum/average gradation changer 32*a* sets the representative gradation value in each of the areas 50 as the average gradation value in each of the areas 50 for the display image excluding the character string image. Then, the lighting rate calculator 32 sets the backlight lighting rate of each light emitting region corresponding to each of the areas 50 to the luminance value corresponding to the representative gradation value changed by the maximum/average gradation changer 32*a***.

The lighting rate converter 33 uses a predetermined conversion formula, or the like, to convert the backlight lighting rate received from the lighting rate calculator 32 into an output backlight lighting rate. The conversion formula is a formula to change the intensity of local dimming. The intensity of local dimming is the magnitude of the adjustment amount of light emitted from the backlight device 20 to the display 10. As the intensity of local dimming is higher, the adjustment amount of light increases, and the contrast of a video increases. As the intensity of local dimming is lower, the adjustment amount of light decreases, and the contrast decreases. Further, the intensity of local dimming corresponds to the change width of the output backlight lighting rate. As the intensity of local dimming is higher, the change width of the output backlight lighting rate increases, and as the intensity of local dimming is lower, the change width of the output backlight lighting rate decreases.

The image corrector 34 corrects the image data to be displayed on the display 10 in accordance with the output backlight lighting rate. For example, when the output backlight lighting rate is converted to 50% with respect to the backlight lighting rate of 100%, the amount of light to be emitted to the display panel 11 is supposed to be substantially half of the amount of light to be emitted. Therefore, in order to maintain the brightness of the image to be displayed on the display panel 11, it is necessary to substantially double the gradation value of the image to be displayed. As described above, when the output backlight lighting rate is changed for each of the areas 50, the gradation of the image to be displayed also needs to be corrected for each of the areas 50. The image corrector 34 transmits the corrected image data to the display 10.

Character Detector (Example of Image Determiner)

Figure 3:
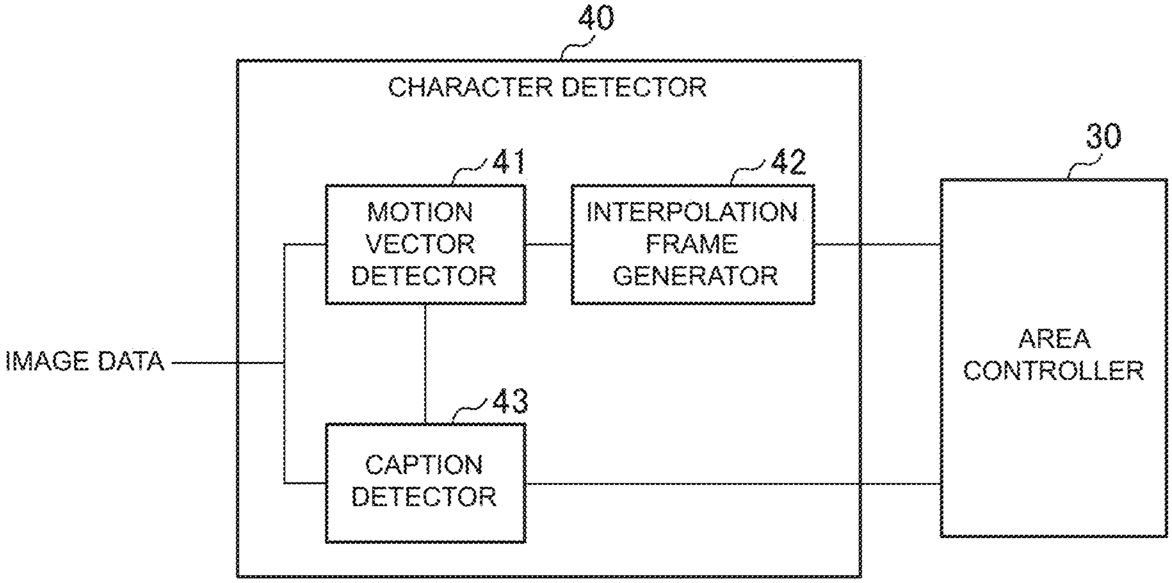
FIG. 3 is a block diagram illustrating an example of a configuration of a primary part of a character detector included in the display device according to the first embodiment of the present disclosure.

Next, a detailed configuration of the character detector 40 included in the display device 1 according to the first embodiment of the present disclosure will be described with reference to FIG. 3. FIG. 3 is a block diagram illustrating an example of a configuration of a primary part of the character detector 40 included in the display device 1 according to the first embodiment of the present disclosure. In the case described here, the character string image is a caption image. The character determiner 40 is an example of an image determiner that determines whether an image includes a target image having a contrast (difference in brightness) higher than a reference contrast. Specifically, according to the present embodiment, the character determiner 40 determines whether the image includes a plurality of character images to determine whether the image includes the target image having a contrast higher than the reference contrast. For example, when the plurality of character images serving as the target images is displayed, in particular, in black and white, it is determined that the character images have a contrast higher than the reference contrast. However, even when the plurality of character images serving as the target images is not displayed in black and white (for example, displayed in red and white), the character images may have a contrast higher than the reference contrast. In this specification, the target image is an image having a high contrast and including an area having a constant luminance (the graph representing the relationship between luminance and position is flat) and may include a character image. According to the present embodiment, the high contrast means, for example, a state in which the luminance is different by about two to three times in comparison between the two areas 50 or a state in which the 8-bit gradation difference is approximately 50.

In this specification, the reference contrast is any previously set contrast, and the contrast means a difference between the luminance values of the two or more areas 50 in the target image. The unit representing the magnitude of luminance includes lux (lx), candela (cd), lumen (lm), nit (nt/nit), and the like. The contrast is a ratio between "white (maximum luminance)" and "black (minimum luminance)" in the screen. The contrast may be expressed as, for example, "500:1" or more. In this case, the number "500" on the left side means white, and the number "1" on the right side means black. Further, the contrast may be described as, for example, a gradation difference of 50 or more. That is, the contrast may be expressed in any form such as lux, candela, lumen, nit, or a gradation difference. The relationship between the luminance and the gradation value draws a gamma curve, and therefore, strictly speaking, the contrast (difference in brightness) is different from the gradation difference.

The character detector 40 may be implemented by what is called a Motion Estimation and Motion Compensation (MEMC) control circuit including a motion vector detector 41, an interpolation frame generator 42, and a caption detector 43 as illustrated in FIG. 3.

The motion vector detector 41 detects a motion vector indicating the moving direction and the moving velocity of a subject, or the like, between a frame A and a frame B of images that are temporally adjacent to each other. Then, the motion vector detector 41 transmits the detection result to the interpolation frame generator 42.

The interpolation frame generator 42 generates an interpolation frame for interpolating between the frame A and the frame B based on the motion vector detected by the motion vector detector 41 and transmits the interpolation frame together with the image data to the area controller 30.

The caption detector 43 determines the presence or absence of a caption image including a plurality of character images based on the detection result of the motion vector by the motion vector detector 41 and the change in the luminance in the image data and detects the display region of the caption image. Specifically, when there is a region that has no motion as determined by the motion vector detector 41 and no change in the luminance, the caption detector 43 determines that the region is the display region of the caption image. Then, the caption detector 43 transmits the information indicating the display region of the caption image to the area controller 30 as the display region information of the character image.

The character detector 40 is not limited to the above-described MEMC control circuit. For example, the character detector 40 may be configured to use an AI technique to analyze the image data and detect a specific pattern indicating a caption image. In this way, when the character detector 40 is configured to use an AI technique to detect a caption image, the character detector 40 may be implemented by a main controller such as a CPU that performs various types of control of each unit of the display device 1.

Furthermore, when a character string image displayed on the display image is on-screen display (OSD), the character detector 40 may be an OSD generator (not illustrated). The OSD generator performs a process to superimpose character information such as menu display and channel display as OSD on a display image and may be implemented by, for example, a main controller such as a CPU. When the character detector 40 is implemented by the OSD generator, the OSD generator transmits the position where the generated OSD is displayed as the display region information of the character image to the area controller 30.

Figures 4, 5:
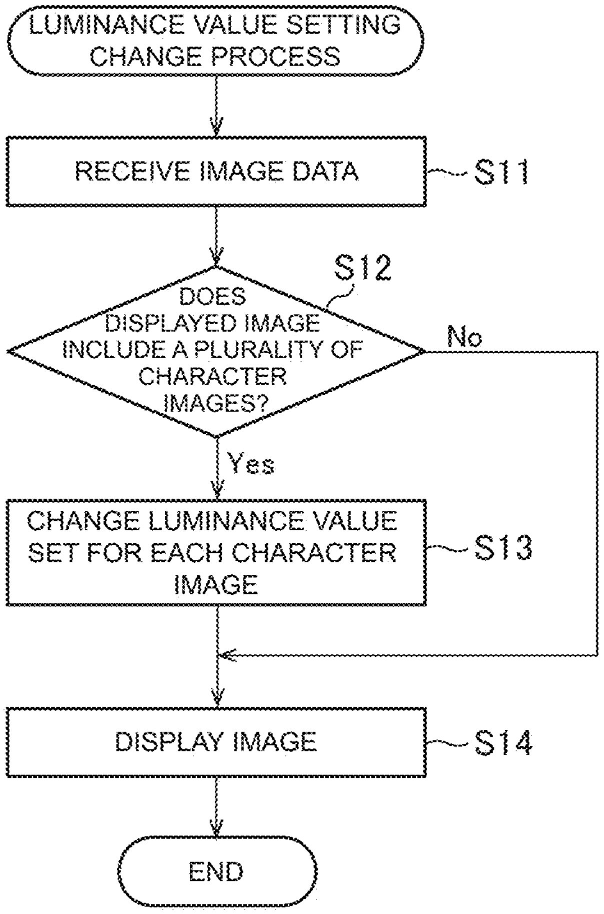
FIG. 4 is a table illustrating an example of the correspondence relationship between a character string image displayed on the display device according to the first embodiment of the present disclosure and an average gradation value and a maximum gradation value of each character image.
FIG. 5 is a flowchart illustrating an example of a luminance value setting change process of the display device according to the first embodiment of the present disclosure.

As described above, the display device 1 according to the first embodiment of the present disclosure has a configuration in which the maximum/average gradation changer **32*a* included in the lighting rate calculator 32 sets the representative gradation value of each of the areas 50 corresponding to each of the plurality of character images as the maximum gradation value in each of the areas 50 and calculates the backlight lighting rate. Therefore, as illustrated in FIG. 4, each of the character images of "レ", "ベ", and "ル" having a small average gradation value may be displayed with the gradation corresponding to the maximum gradation. Therefore, it is possible to suppress luminance unevenness of caption images, and the like, including a plurality of character images. FIG. 4 is a table illustrating an example of the correspondence relationship between a character string image displayed on the display device 1 according to the first embodiment of the present disclosure and an average gradation value and a maximum gradation value of each character image. In the example illustrated in FIG. 4, the respective areas 50 of "黒", "レ", "ベ", and "ル" include 255 gradations as the maximum gradation value, and therefore the representative gradation value of each of the areas 50** may be set to 255 gradations.

The lighting rate calculator 32 has a configuration in which the representative gradation value of each of the areas 50 corresponding to each of the plurality of character images is set as the maximum gradation value in each of the areas 50, but instead of the maximum gradation value, the value obtained by adding the average gradation value and the maximum gradation value at a predetermined ratio (representative gradation value=average gradation value·α+maximum gradation value·(1−α); 0≤α≤1) may be used. As described above, even when the representative gradation value is set to the value obtained by adding the average gradation value and the maximum gradation value in each of the areas 50 at a predetermined ratio, the difference between the representative gradation values in the respective areas 50 corresponding to the plurality of character images may be reduced. Therefore, it is possible to improve luminance unevenness in the character string image.

Furthermore, a configuration may be such that, when the character string image is OSD, the value of the above-described predetermined ratio for the maximum gradation value is changed in accordance with the alpha value (transparency) of the OSD. Specifically, when the alpha value of the OSD is large, the transparency of the OSD is high, and therefore, it is desirable to mainly display the display image on which the OSD is superimposed. Therefore, when the alpha value of the OSD is large, the above-described predetermined ratio for the maximum gradation value is set to be as small as possible. Conversely, when the alpha value of the OSD is small, the transparency of the OSD is low, and therefore it is desirable to mainly display the OSD. Thus, when the alpha value of the OSD is small, the above-described ratio for the maximum gradation value is set to a value as close to the maximum gradation value as possible.

As illustrated in FIG. 5, the display device 1 having the above-described configuration may change the luminance value set for each character image. FIG. 5 is a flowchart illustrating an example of a luminance value setting change process of the display device 1 according to the first embodiment of the present disclosure.

First, the display device 1 receives image data (Step S11). When receiving the image data, the character detector 40 determines whether the image displayed on the display 10 includes a plurality of character images (Step S12).

When the character detector 40 determines that a plurality of character images is not included ("No" in Step S12), the process proceeds to Step S14. Conversely, when the character detector 40 determines that a plurality of character images is included ("Yes" in Step S12), the area controller 30 changes the luminance value set for each character image (Step S13). Specifically, the area controller 30 controls the lighting rate of the mini LED 22, which emits light to each of the areas 50 where each character image is displayed, to change the luminance value.

Then, the backlight device 20 irradiates the display panel 11 included in the display 10 with light based on the set luminance value to display the image on the display panel 11 (Step S14).

Second Embodiment

As described above, in the display device 1 according to the first embodiment of the present disclosure, when the character detector 40 determines that the display image includes a character string image including a plurality of character images, the maximum/average gradation changer 32*a* included in the lighting rate calculator 32 sets the maximum gradation value in each of the areas 50 corresponding to each of the plurality of character images as the representative gradation value of each of the areas 50.

Figure 6:
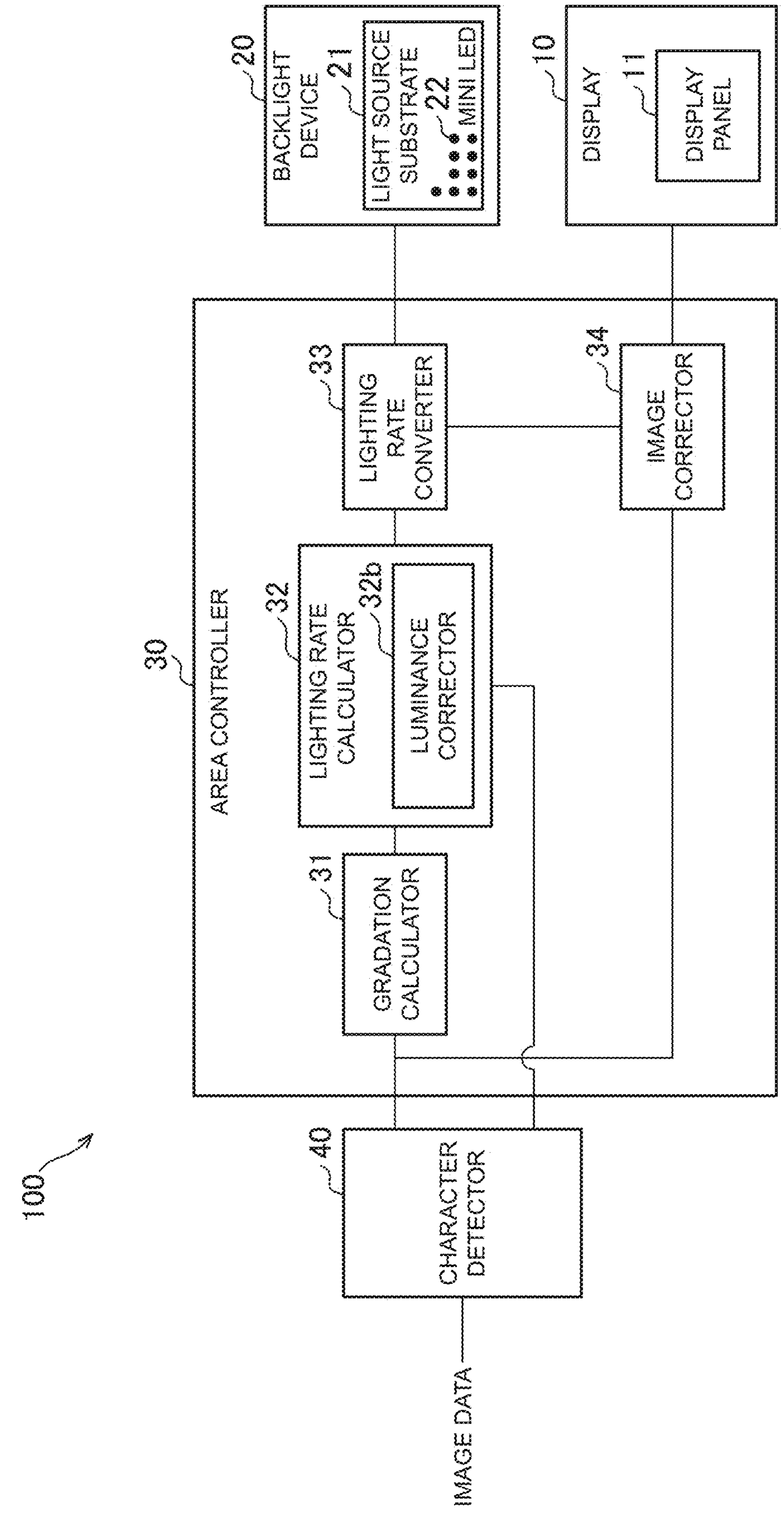
FIG. 6 is a block diagram illustrating an example of a configuration of a primary part of a display device according to a second embodiment of the present disclosure.

Conversely, as illustrated in FIG. 6, a display device 100 according to a second embodiment of the present disclosure is different in that the lighting rate calculator 32 includes a luminance corrector 32*b* instead of the maximum/average gradation changer 32*a*. FIG. 6 is a block diagram illustrating an example of a configuration of a primary part of the display device 100 according to the second embodiment of the present disclosure. In the display device 100 according to the second embodiment, the same members as those of the display device 1 according to the first embodiment are denoted by the same reference numerals, and the descriptions thereof are omitted.

Figures 7, 8:
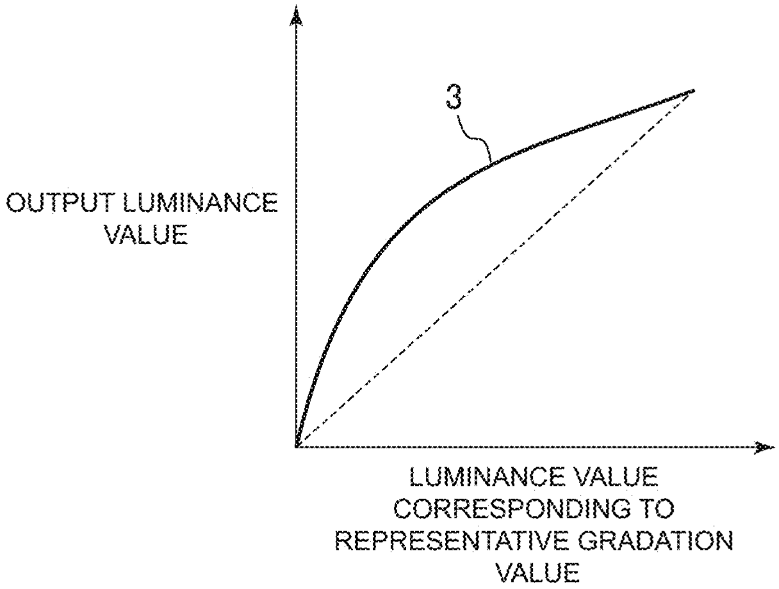
FIG. 7 is a graph illustrating an example of the relationship between a luminance value (input luminance value) corresponding to a representative gradation value and a luminance value (output luminance value) of a display image displayed on a display.
FIG. 8 is a table illustrating an example of the correspondence relationship between a character string image displayed on the display device according to the second embodiment of the present disclosure and a representative gradation value and an output gradation value of each character image.

Specifically, in the display device 100, the luminance value corresponding to the average gradation value of each of the areas 50 corresponding to each of the plurality of character images is corrected by using a luminance correction formula 3 (correction formula) that is the graph illustrated in FIG. 7. FIG. 7 is a graph illustrating an example of the relationship between the luminance value (input luminance value) corresponding to the representative gradation value and the luminance value (output luminance value) of the display image displayed on the display 10. In FIG. 7, the horizontal axis represents the luminance value (input luminance value) corresponding to the representative gradation value, and the vertical axis represents the luminance value (output luminance value) of the display image displayed on the display 10. In addition, the broken line indicates a case where the input luminance value and the output luminance value have a proportional relationship, and the solid line indicates the relationship between the input luminance value and the output luminance value according to the luminance correction formula 3 adopted by the display device 100 according to the second embodiment. As illustrated in FIG. 7, the graph representing the luminance correction formula 3 adopted by the display device 100 according to the second embodiment is a graph drawing an upwardly convex curve along the linear graph in which the input luminance value and the output luminance value have a proportional relationship. In other words, it can be said that the luminance correction formula adopted by the display device 100 according to the second embodiment is a formula in which the difference between the output luminance value with respect to the intermediate input luminance value and the output luminance value with respect to the maximum input luminance value is smaller than that when the input luminance value and the output luminance value have a proportional relationship.

In this way, in a case where the graph representing the luminance correction formula 3 is a curve (for example, a curve for gamma correction) that is convex upward along a linear graph, even when the luminance value corresponding to the representative gradation value is lower than the maximum luminance value, the output luminance value may be increased compared to the case where the input luminance value and the output luminance value have a proportional relationship. That is, as illustrated in FIG. 8, with regard to the character images of "黒", "レ", "ベ", and "ル", the luminance corrector 32*b* may set the output gradations of "レ", "ベ", and "ル" having a smaller representative gradation value than "黒" to a gradation close to the output gradation of "黒". Therefore, the display device 100 according to the second embodiment may suppress luminance unevenness in the character string image. FIG. 8 is a table illustrating an example of the correspondence relationship between the character string image displayed on the display device according to the second embodiment of the present disclosure and the representative gradation value and the output gradation value of each character image.

Third Embodiment

As described above, in the configuration of the display device 1 according to the first embodiment of the present disclosure, when the character detector 40 determines that the display image includes a plurality of character images, the maximum/average gradation changer 32*a* included in the lighting rate calculator 32 sets the maximum gradation value in each of the areas 50 corresponding to each of the plurality of character images as the representative gradation value of each of the areas 50.

Figure 9:
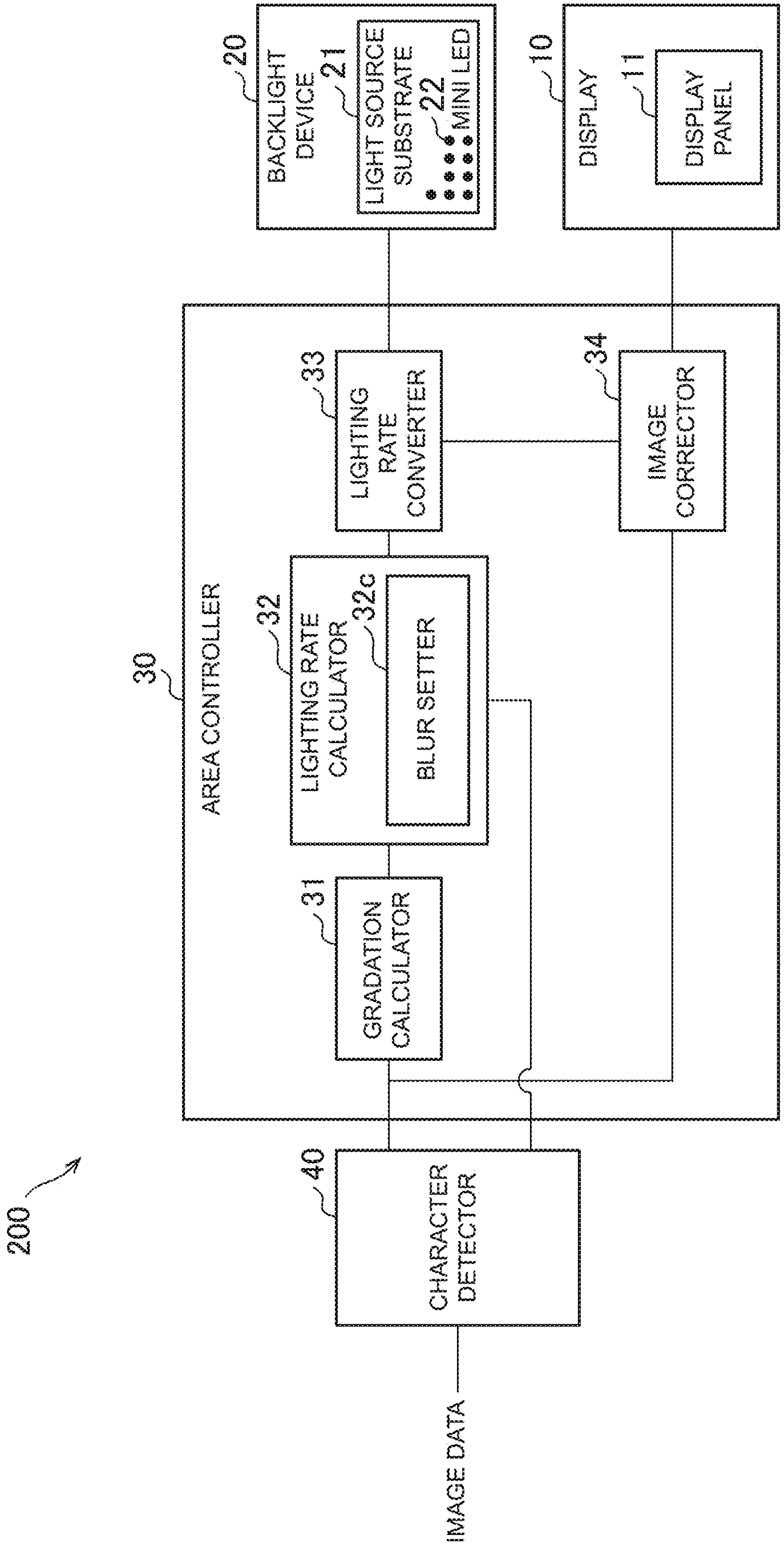
FIG. 9 is a block diagram illustrating an example of a configuration of a primary part of a display device according to a third embodiment of the present disclosure.

Conversely, as illustrated in FIG. 9, a display device 200 according to a third embodiment of the present disclosure is different in that the lighting rate calculator 32 includes a blur setter 32*c* instead of the maximum/average gradation changer 32*a*. FIG. 9 is a block diagram illustrating an example of a configuration of a primary part of the display device 200 according to the third embodiment of the present disclosure. In the display device 200 according to the third embodiment, the same members as those of the display device 1 according to the first embodiment are denoted by the same reference numerals, and the descriptions thereof are omitted.

Specifically, in the display device 200, the control is performed such that the range of light emitted to each of a plurality of pixels 51 in each of the areas 50 corresponding to each of the plurality of character images is expanded and emitted to the periphery thereof.

Figure 10:
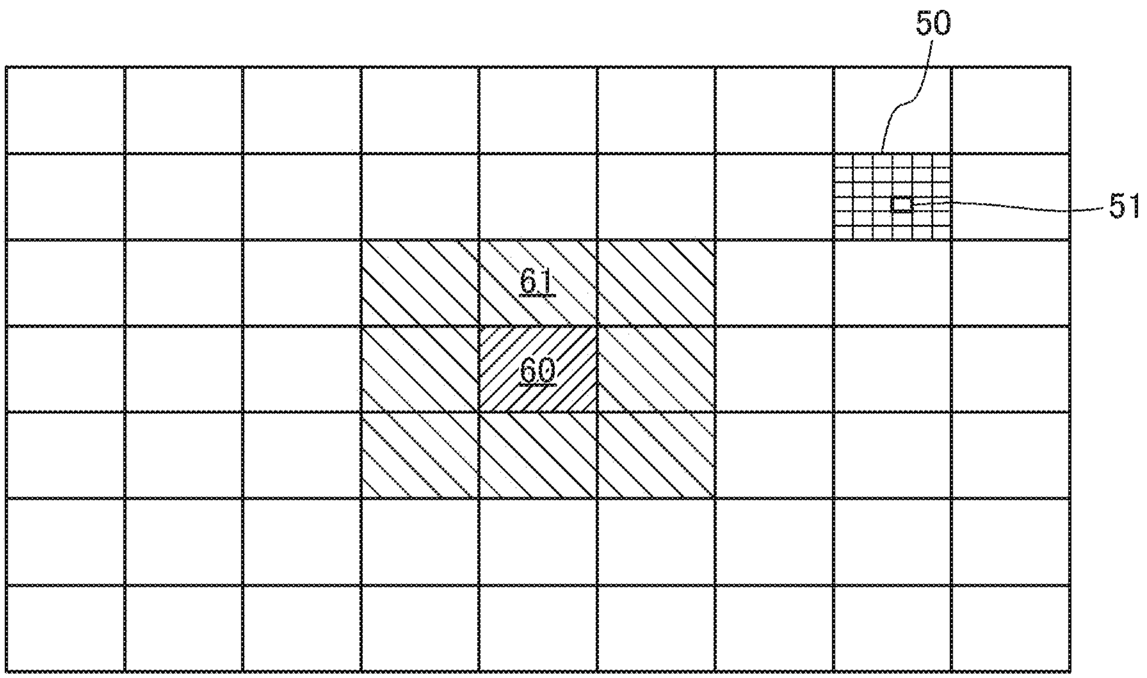
FIG. 10 is a diagram illustrating an example of a lighting range by a mini LED in the display included in the display device according to the third embodiment of the present disclosure.

Specifically, in the display device 200, light is emitted from the mini LED 22 corresponding to each of the areas 50. Typically, when the one area 50 is displayed, as illustrated in FIG. 10, only a lighting range 60 corresponding to the one area 50 is irradiated with light emitted from the mini LED 22. However, in the display device 200, a range adjacent to the lighting range 60 is also a lighting range (a first adjacent lighting range 61). FIG. 10 is a diagram illustrating an example of the lighting range by the mini LED 22 in the display 10 included in the display device 200 according to the third embodiment of the present disclosure. The luminance value of the first adjacent lighting range 61 is a value that is a predetermined percentage of the luminance value of the lighting range 60. The ratio of the luminance value of the first adjacent lighting range 61 to the luminance value of the lighting range 60 may be set as appropriate in accordance with the type of content to be displayed on the display 10. For example, in the case of content including a bright image such as a firework, the ratio of the luminance value of the first adjacent lighting range 61 to the luminance value of the lighting range 60 may be set to be higher than that in the case of content including a dark image.

The blur setter 32*c* obtains the luminance value of the lighting range 60 corresponding to each of the areas 50 and the luminance value of the first adjacent lighting range 61 corresponding to each of the lighting ranges 60. Here, when any of the areas 50 is set as an area of interest, the luminance value of the lighting range 60 corresponding to the area of interest may be obtained as follows. Specifically, the luminance value of the lighting range 60 corresponding to the area of interest is obtained by adding, to the luminance value previously set in the lighting range 60 of the area of interest, the luminance value of the first adjacent lighting range 61 corresponding to each of the lighting ranges 60 of the plurality of surrounding areas 50 adjacent to the area of interest.

In other words, the blur setter 32*c* adds, to the luminance value of the lighting range 60 set corresponding to the area 50 displaying a first character image among the plurality of character images, the value that is a predetermined percentage of the luminance value of the lighting range 60 set corresponding to the area 50 displaying a second character image adjacent to the first character image. Then, the blur setter 32*c* changes the luminance value in the area 50 corresponding to each character image.

In this way, the luminance value is set such that the light from the mini LED 22 illuminating each of the areas 50 reaches the area 50 adjacent to each of the areas 50 so that the luminance value of the desired area 50 may be increased. Therefore, it is possible to increase the luminance value of the area 50 in which the luminance value decreases, and thus it is possible to suppress the occurrence of luminance unevenness in a character string image including a plurality of character images.

Figure 11:
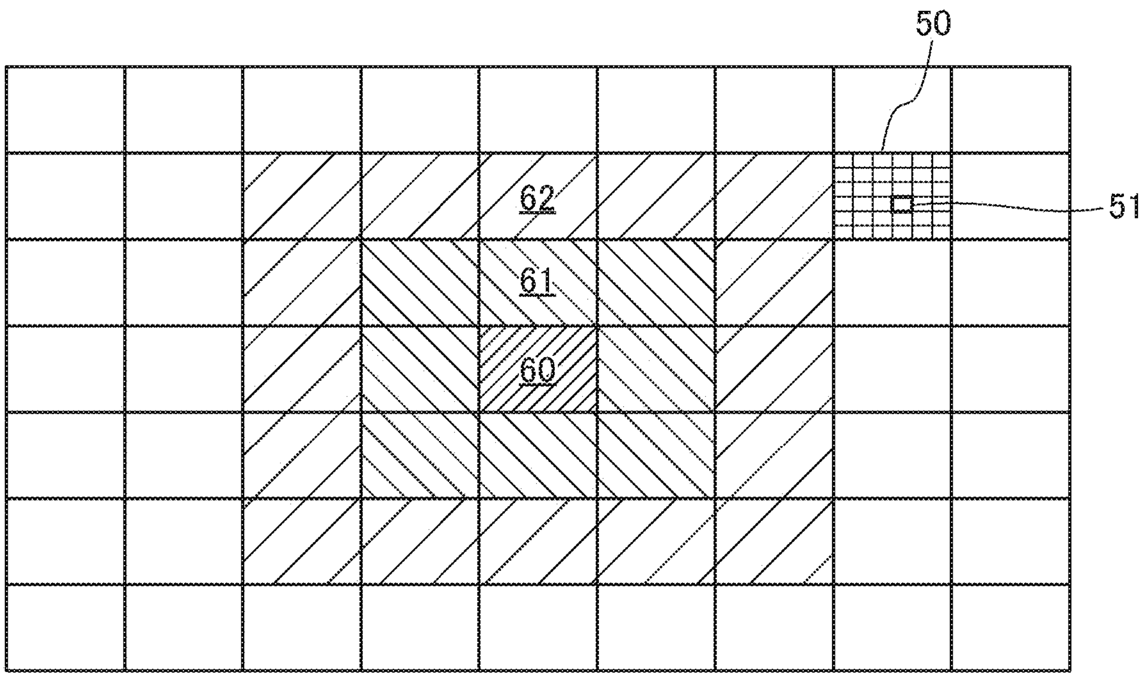
FIG. 11 is a diagram illustrating an example of a lighting range by the mini LED in the display included in the display device according to the third embodiment of the present disclosure.

As illustrated in FIG. 11, a configuration may be such that, in addition to the above-described first adjacent lighting range, a second adjacent lighting range 62 having the range surrounding the outer periphery of the first adjacent lighting range as a lighting range is further provided. FIG. 11 is a diagram illustrating an example of a lighting range by the mini LED 22 in the display 10 included in the display device 200 according to the third embodiment of the present disclosure.

Fourth Embodiment

A display device 300 according to a fourth embodiment will be described with reference to FIGS. 12 to 15. In the following description, the same points as those of the display device 300 according to each of the above-described embodiments will not be repeatedly described. The display device 300 according to the present embodiment is different from the display devices according to the above-described embodiments in the following points.

Figure 12:
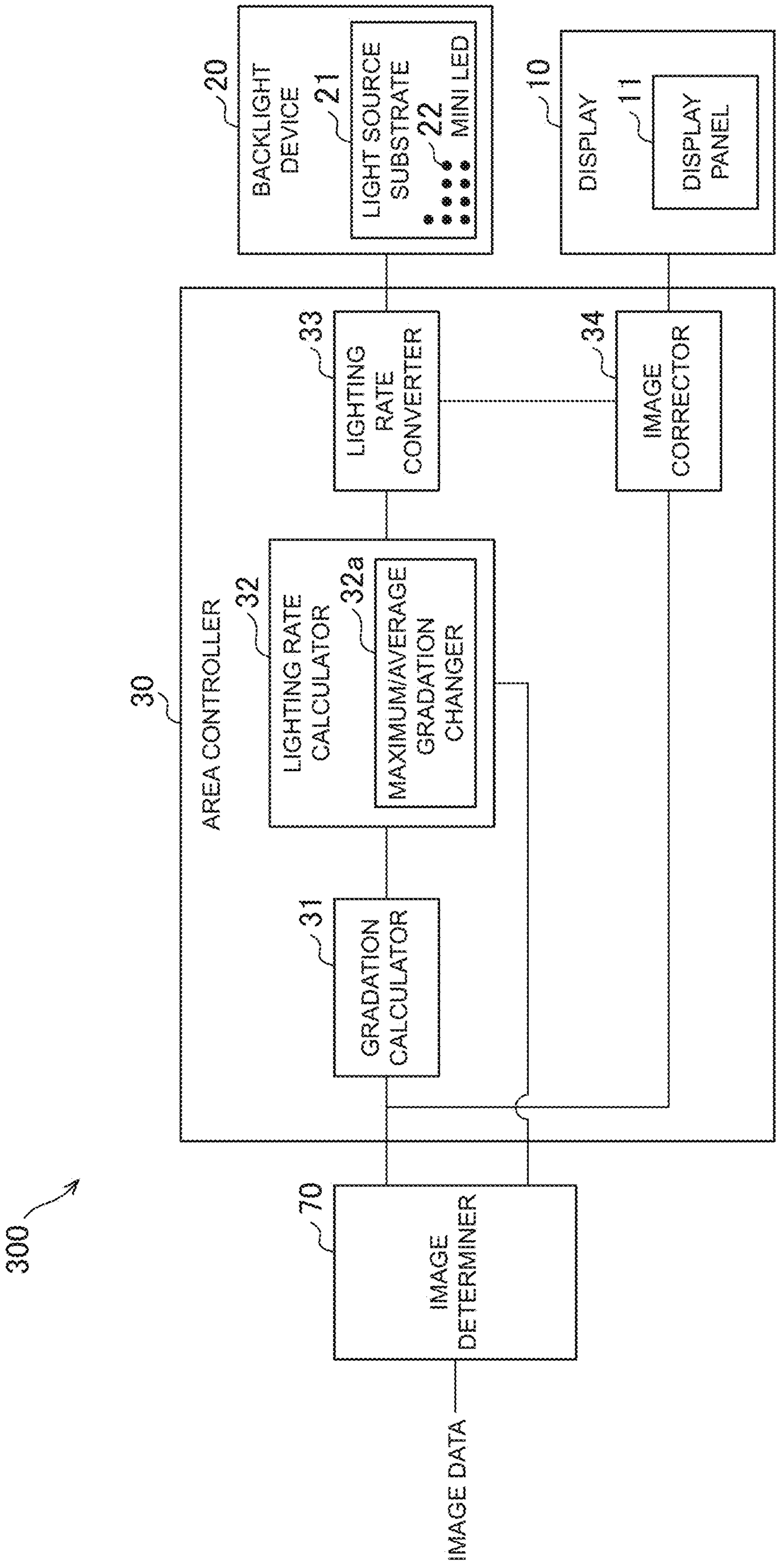
FIG. 12 is a block diagram illustrating an example of a configuration of a primary part of a display device according to a fourth embodiment of the present disclosure.

FIG. 12 is a block diagram illustrating an example of a configuration of a primary part of the display device 300 according to the fourth embodiment.

As illustrated in FIG. 12, the display device 300 according to the present embodiment includes, instead of the character detector 40, an image determiner 70 that determines whether the target image having an area with high contrast and constant luminance (the graph representing the relationship between luminance and position is flat) is included. The high-contrast image is an image having a contrast (difference in brightness) higher than the reference contrast that is set previously and arbitrarily. More specifically, the image determiner 70 of the display device 300 according to the present embodiment determines, based on the image data, whether the image includes the target image in which the area of the image region having a spatial frequency component higher than a specific value is equal to or more than a predetermined value. For example, the image determiner 70 calculates the spatial frequency of the image based on the difference between the input gradation values of two adjacent pixels to be compared. Thus, it is determined whether the calculated spatial frequency is equal to or more than the specific value. Further, the image determiner 70 determines that the area of the image region having a spatial frequency component higher than the specific value is equal to or more than the predetermined value when a predetermined number or more of adjacent pixels, the spatial frequencies of which are determined to be equal to or more than the specific value, continue in the vertical direction and the horizontal direction, respectively. Thus, the image determiner 70 determines that the image displayed on the display panel 11 includes the above-described target image. The image determiner 70 according to the present embodiment is an example of an image determiner that determines whether the image includes the target image having a contrast (difference in brightness) higher than the reference contrast.

In the display device 300 according to the present embodiment, there is a case where the image determiner 70 determines that the image includes the target image. In this case, the lighting rate calculator 32 (luminance value setter) changes the luminance value set for at least one of the plurality of areas 50 in the target image to reduce the difference between the luminance values of the plurality of areas 50 in the target image set based on the image data. The lighting rate calculator 32 may include not only the maximum/average gradation changer 32*a* illustrated in FIG. 1 but also the luminance corrector 32*b* illustrated in FIG. 6 or the blur setter 32*c* illustrated in FIG. 9.

Figure 13:
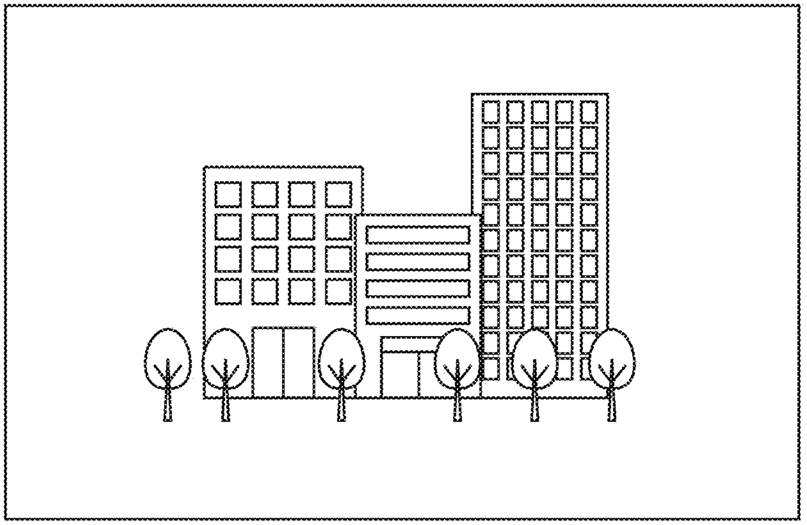
FIG. 13 is a diagram illustrating a group of buildings as an example of an artifact image displayed by the display included in the display device according to the fourth embodiment of the present disclosure.
Figure 14:
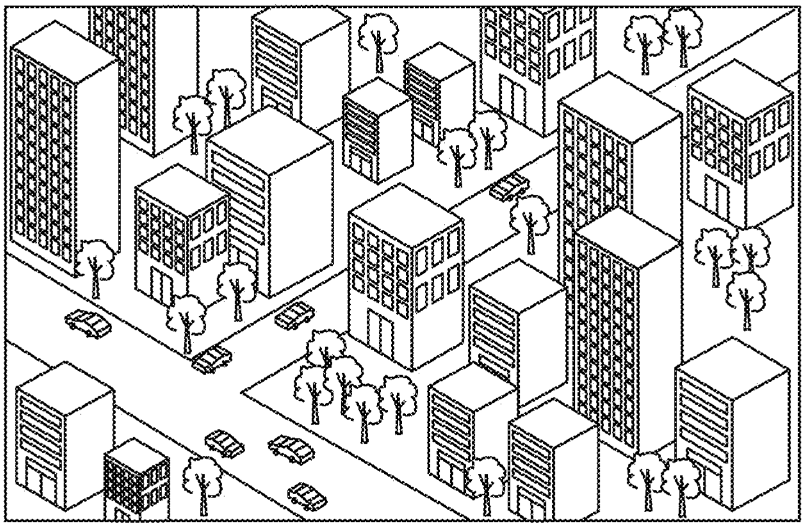
FIG. 14 is a diagram illustrating a town as an example of an artifact image displayed by the display included in the display device according to the fourth embodiment of the present disclosure.
Figure 15:
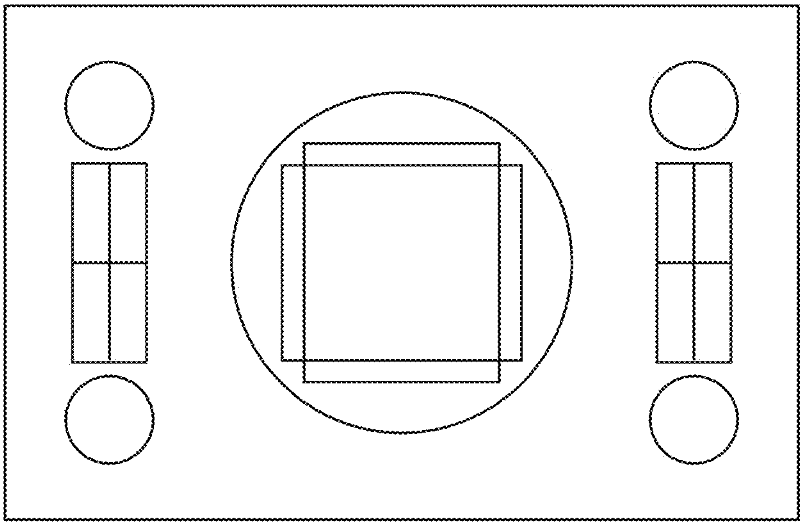
FIG. 15 is a diagram illustrating an example of a test pattern image displayed by the display included in the display device according to the fourth embodiment of the present disclosure.

The target image according to the present embodiment may be a high-contrast artifact image, such as a close view of a group of buildings illustrated in FIG. 13 or a town illustrated in FIG. 14, or a high-contrast image such as a test pattern illustrated in FIG. 15. Therefore, the target image according to the present disclosure includes the plurality of character images used in the first to third embodiments, the artifact image or the test pattern image described in the present embodiment, etc.

The character detector 40 and the area controller 30 included in the display device 1 according to the first embodiment, the display device 100 according to the second embodiment, and the display device 200 according to the third embodiment may be implemented when an arithmetic processing device reads and executes a program stored in a storage device. Further, the image determiner 70 and the area controller 30 included in the display device 300 according to the fourth embodiment may be implemented when an arithmetic processing device reads and executes a program stored in a storage device. For example, in the case of a configuration in which the display device 1, the display device 100, the display device 200, and the display device 300 include a central processing unit (CPU) as an arithmetic processing device, the CPU may read and execute a program stored in a storage device to implement the character detector 40 (or the image determiner 70) and the area controller 30. In addition, the storage device that stores the program may be a non-transitory recording medium such as a computer-readable read only memory (ROM), an optical disk, or a hard disk drive.

Further, a configuration may be such that the character detector 40 (or the image determiner 70) and the area controller 30 are implemented by a dedicated circuit including an electronic circuit used only for executing the above-described control. The above-described CPU, i.e., the processor and the dedicated circuit are included in a device called a controller.

What is claimed is:

1. A display device comprising:
a display that displays an image based on image data;
a backlight device that irradiates the display with light;
an image determiner that determines, based on the image data, whether the image includes a target image having a contrast higher than a reference contrast; and
a luminance value setter that sets each luminance value of the image based on the image data, wherein
when the image determiner determines that the image includes the target image, the luminance value setter changes the luminance value set for at least one of two or more areas in the target image to reduce a difference between the luminance values of the two or more areas in the target image set based on the image data.

2. The display device according to claim 1, wherein the target image includes a character image, an artifact image, or a test pattern image.

3. The display device according to claim 1, wherein the luminance value setter divides the image into a plurality of areas including the two or more areas and sets the luminance value for each of the plurality of areas based on the image data.

4. The display device according to claim 1, wherein the backlight device includes a plurality of mini LEDs as light sources.

5. The display device according to claim 1, wherein
the image determiner is a character determiner that determines, based on the image data, whether the image includes a plurality of character images as the target image, and
when the character determiner determines that the image includes the plurality of character images, the luminance value setter changes the luminance value set for at least one of the plurality of character images to reduce a difference between the luminance values of the plurality of character images set based on the image data.

6. The display device according to claim 5, wherein the luminance value setter sets the luminance value set for each of the plurality of character images to a predetermined luminance value based on luminance values of a plurality of pixels constituting each of the plurality of character images.

7. The display device according to claim 5, wherein the luminance value setter sets the luminance value set for each of the plurality of character images to a maximum luminance value among luminance values of a plurality of pixels constituting each of the plurality of character images.

8. The display device according to claim 5, wherein
the luminance value setter outputs, to the backlight device, an output luminance value obtained by correcting an input luminance value, which is the luminance value of each of the plurality of character images set based on the image data, by using a correction formula, and
a graph representing the correction formula is a graph drawing an upwardly convex curve along a graph in which a relationship between the input luminance value and the output luminance value is a proportional relationship.

9. The display device according to claim 5, wherein the luminance value setter adds, to the luminance value set for a first character image among the plurality of character images, a value that is a predetermined percentage of the luminance value set for a second character image adjacent to the first character image to change the luminance value of the first character image.

10. The display device according to claim 1, wherein the target image is an image in which an area of an image region having a spatial frequency component higher than a specific value is equal to or more than a predetermined value.

11. A method for controlling a display device comprising:
determining, based on image data, whether an image to be displayed on a display includes a target image having a contrast higher than a reference contrast; and
setting each luminance value of the image based on the image data, wherein
when it is determined in the determining that the image includes the target image, the setting changes the luminance value set for at least one of two or more areas in the target image to reduce a difference between the luminance values of the two or more areas in the target image set based on the image data.

* * * * *